May 26, 1959      R. C. RIKE      2,887,848
BRAKE POWER BOOSTER
Filed July 9, 1953      3 Sheets-Sheet 2
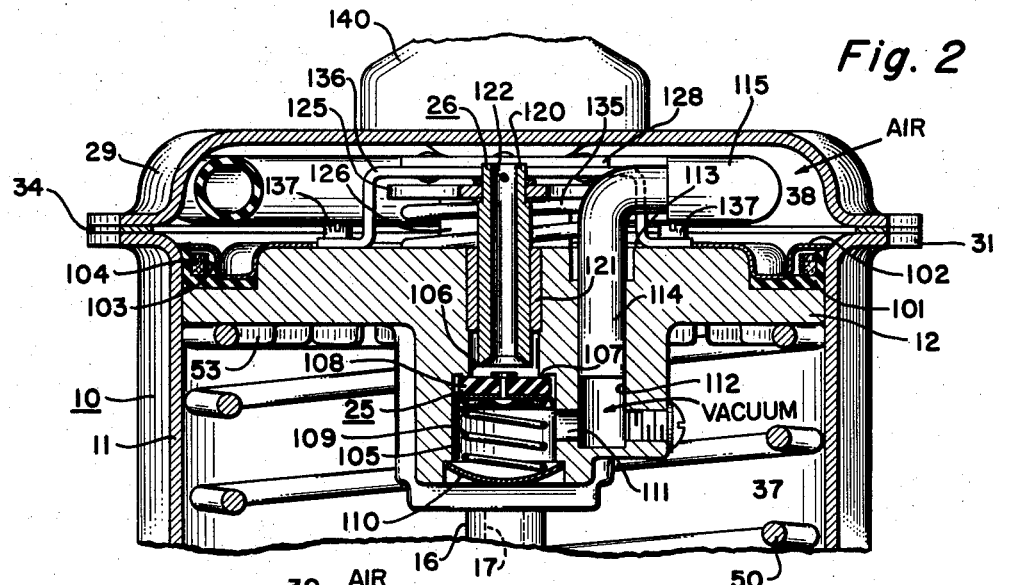
Fig. 2
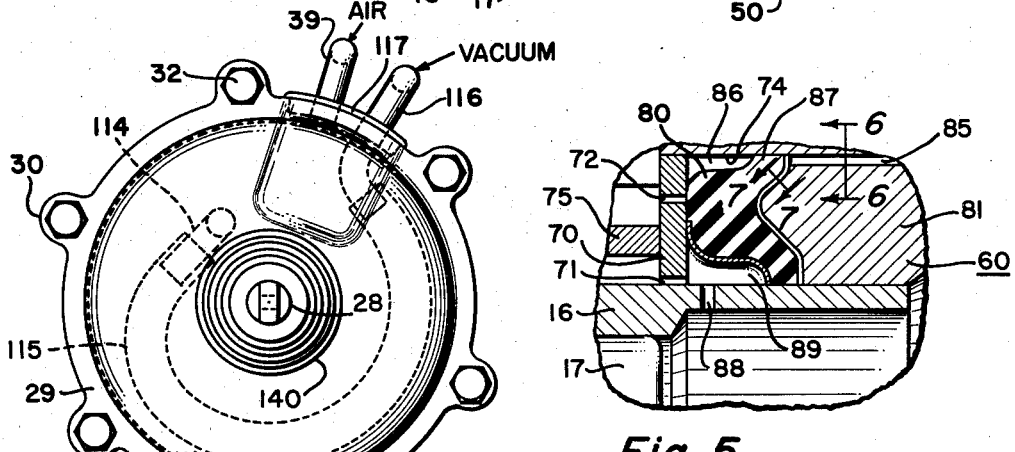
Fig. 3
Fig. 5
Fig. 6
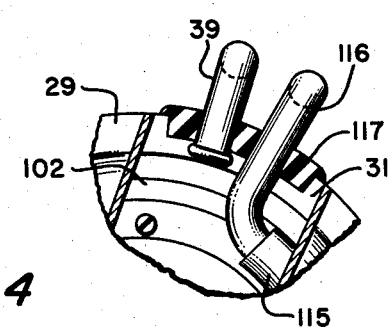
Fig. 4
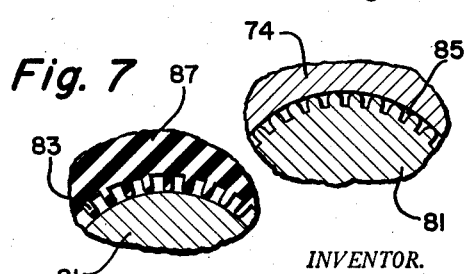
Fig. 7
INVENTOR.
Richard C. Rike
BY
His Attorney May 26, 1959
R. C. RIKE
2,887,848
BRAKE POWER BOOSTER
Filed July 9, 1953
3 Sheets-Sheet 3
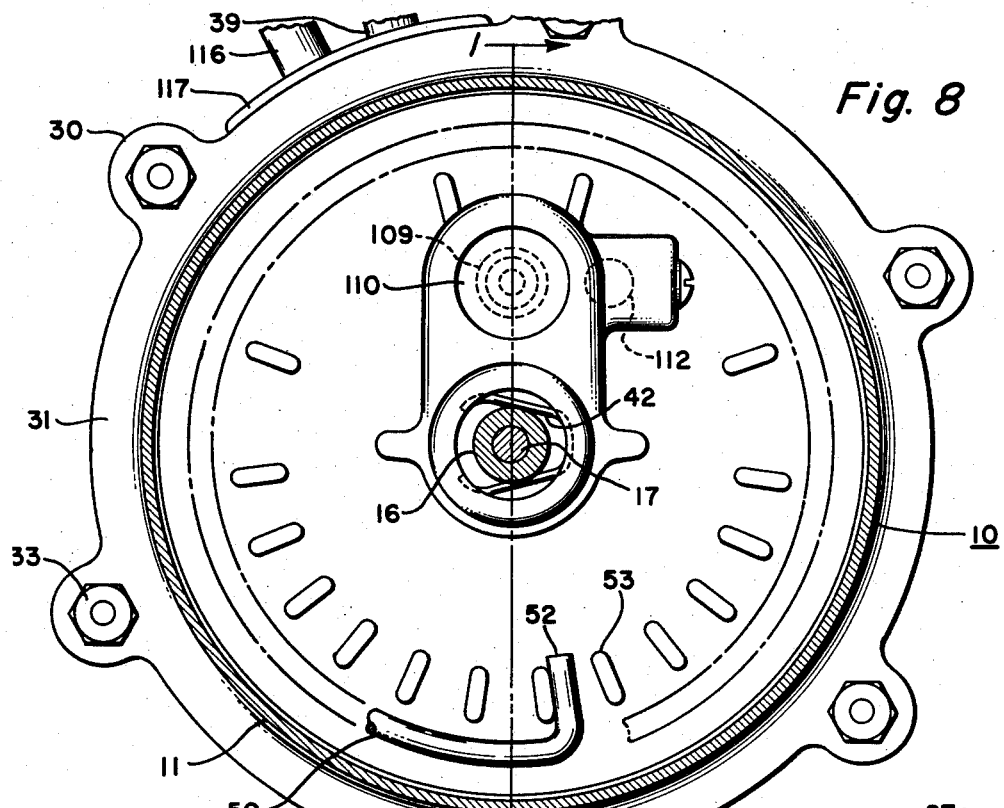
Fig. 8
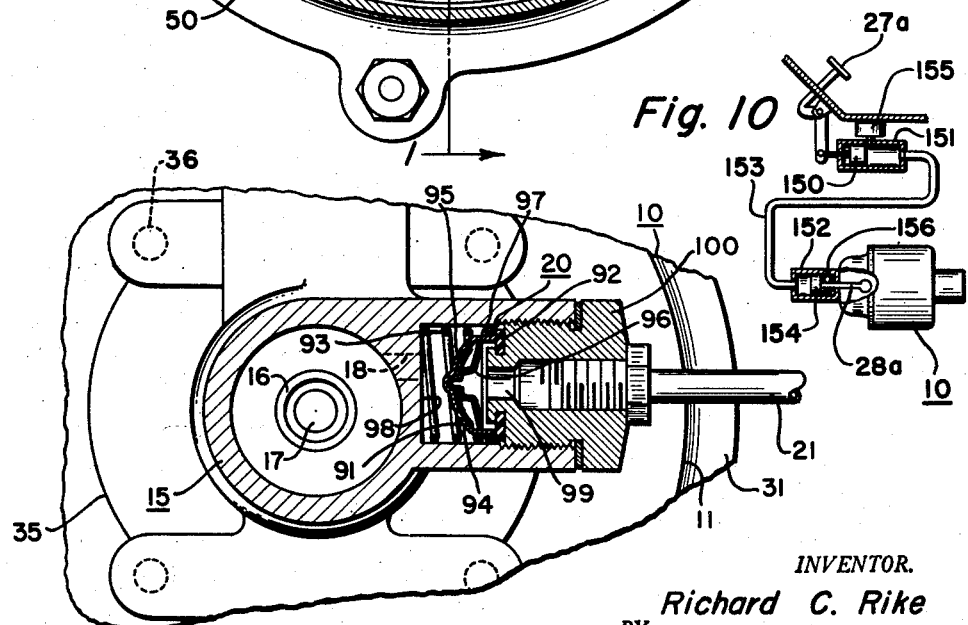
Fig. 9
Fig. 10
INVENTOR.
Richard C. Rike
BY
His Attorney United States Patent Office 2,887,848
Patented May 26, 1959

2,887,848

BRAKE POWER BOOSTER

Richard C. Rike, Dayton, Ohio, assignor to General Motors Corporation, Detroit, Mich., a corporation of Delaware Application July 9, 1953, Serial No. 366,891

6 Claims. (Cl. 60—54.6)

This invention relates to a power unit for automotive hydraulic brakes adapted for providing the major portion of the braking effort required for an automotive vehicle.

An object of the invention is to provide an improved power unit for use in an automotive hydraulic brake system wherein the power unit and the master cylinder are arranged as a unitary structure.

It is another object of the invention to provide a power unit having a pressure differential operated motor that power actuates a tubular piston within a master cylinder in cooperation wtih a reaction rod that slidably extends through the tubular piston into the master cylinder, the reaction rod being operated in response to manual actuation of the reaction rod and the tubular piston providing the means for creating fluid pressure in the master cylinder in cooperation with the reaction rod.

It is still another object of the invention to provide a power unit for an automotive hydraulic brake system utilizing a pressure differential operated motor that incorporates an improved poppet valve structure for controlling application of negative pressure to one side of the power piston of the power unit.

It is still another object of the invention to provide a power unit for an automotive hydraulic brake system utilizing a pressure differential motor that effects actuation of a piston within a master cylinder, an improved seal structure being provided between the piston and the master cylinder to prevent leakage of hydraulic fluid from the master cylinder into the power motor.

It is another object of the invention to provide an improved power unit for a hydraulic brake system utilizing a pressure differential operated motor wherein the structures of the motor are coaxially arranged and are prevented from relative rotation by means of spring anchors provided at each end of the compression spring that positions the power piston at one end of the power cylinder.

Further objects and advantages of the present invention will be apparent from the following description, reference being had to the accompanying drawings wherein a preferred form of the invention is clearly shown.

In the drawings:

Figure 2 is a cross sectional view taken along line 2—2 of Figure 1.

Figure 3 is an end view of the device illustrated in Figure 1, as viewed from the left hand end thereof.

Figure 4 is a cross sectional view through the power cylinder illustrating the manner of sealing the air inlet and vacuum connections for the unit.

Figure 5 is an enlarged cross sectional view of the master cylinder.

Figure 6 is a cross sectional view taken along line 6—6 of Figure 5.

Figure 7 is a cross sectional view taken along line 7—7 of Figure 5.

Figure 8 is a transverse cross sectional view taken along line 8—8 of Figure 1.

Figure 9 is a cross sectional view through the master cylinder taken along line 9—9 of Figure 1.

Figure 10 is a schematic illustration of a hydraulic connection provided between a manually operated pedal and the power unit for remote manual response of the power unit.

Figure 1:
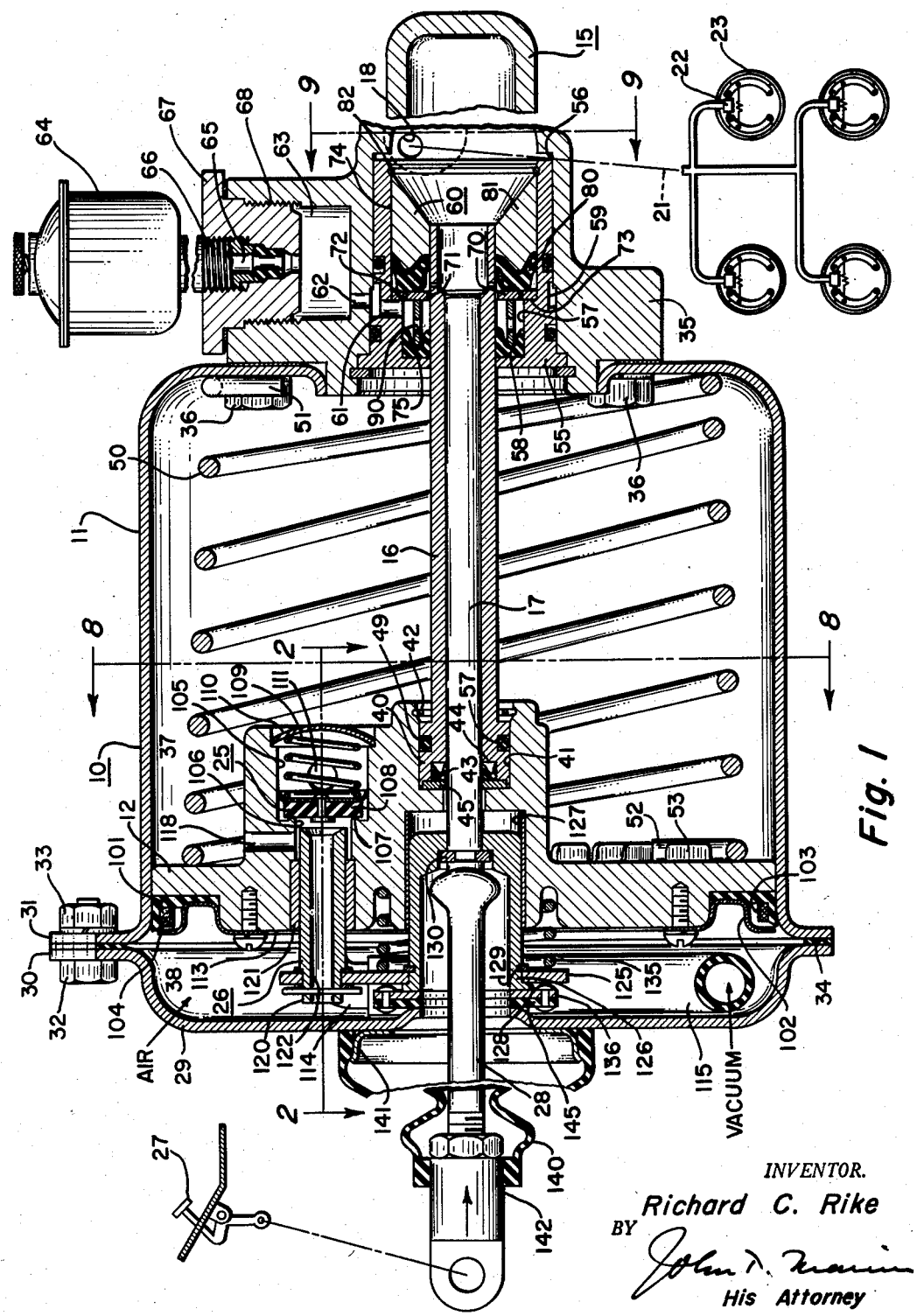
Figure 1 is a longitudinal cross sectional view taken along line 1—1 of Figure 8 of a power unit incorporating features of this invention.

In this invention the power unit consists of a pressure differential operated motor 10 that consists of a cylinder 11 and a power piston 12 reciprocal within the cylinder 11. A master cylinder 15 is attached to one end of the power cylinder 11 and provides the pressure fluid for supply to the brake system of a motor vehicle.

The power piston 12 actuates a tubular piston 16 that has one end thereof projecting into the master cylinder 15. A reaction rod or central piston 17 is slidable within the tubular piston 16 and also enters the master cylinder 15, whereby the coaction of the reaction rod 17 and the tubular piston 16 effect application of pressure on the liquid in the master cylinder 15 to supply hydraulic fluid under pressure to the brake system of the motor vehicle.

Fluid under pressure is discharged from the master cylinder 15 through a discharge opening 18 and a check valve 20 into the pressure line 21. The pressure line 21 connects with wheel cylinders 22 provided in the brakes 23 for each of the wheels of the motor vehicle.

The power piston 12 is actuated by operation of a control valve 25 adapted to control the connection of one side of the power piston 12 with a source of negative pressure, such as the vacuum manifold of an internal combustion engine of any conventional motor vehicle. The valve 25 is operated by a valve actuator 26 that is responsive to operation of a manually operated brake pedal 27. The brake pedal 27 is connected through a pedal push rod 28 with the reaction rod 17 for causing operation of the valve actuator 26.

Operation of the brake pedal 27 will thus cause manual operation of the reaction rod 17 which in turn effects operation of the valve 25 to render active the power piston 12. The power piston 12 moves the tubular piston 16 thereby giving concurrent movement to the reaction rod 17 and the tubular piston 16 for causing pressure upon the fluid in the master cylinder 15 and supply of the same to the brake cylinders 22 of the wheels of the motor vehicle.

The pressure differential operated motor 10 comprises the cylinder housing 11 forming the cylinder of the motor. One end of the cylinder 11 is closed by the closure member 29 that is secured to the cylinder 11 through the flanged portions 30 and 31 that are secured together by the arrangement of the bolt 32 and nut 33 extending through the respective flanges. A gasket 34 seals the joint between the flanges 30 and 31.

At the opposite end of the cylinder 11 the master cylinder 15 includes a housing 35 that is secured to the cylinder 11 by means of suitable bolts 36.

The power piston 12 divides the cylinder 11 into two chambers 37 and 38, the chamber 38 being continuously in connection with atmospheric pressure through the air inlet pipe 39, see Figures 3 and 4. A suitable air filter is provided on the air inlet pipe 39 to prevent entry of dirt into the chamber 38.

The power piston 12 carries the tubular piston 16 that has an enlarged head 40 at one end thereof that is received within the recess 41 provided in the body of the piston 12. The head 40 is retained within the recess 41 by a retaining cap 42, see Figures 1 and 8. A rubber-like seal member 43 is placed in a recess 44 provided in the head 40 on the piston 16. This rubber-like seal member 43 is retained in the recess 44 by a closure member 45. The seal member 43 being substantially U shaped in transverse cross section will thus engage the outer wall of the recess wall 44 and the outer periphery of the reaction rod 17 to seal upon the same and thereby prevent leakage of fluid under pressure between the reaction rod or central piston 17 and the tubular piston 16. An O ring seal member 49 is retained in a recess 57 in the head 40 to seal against leakage between the head 40 and the recess 41.

The power piston 12 is normally spring urged to the position shown in Figure 1 by means of the compression spring 50 that has one end thereof engaging an end wall of the cylinder 11 and the opposite end engaging the inner face of the piston 12. The spring 50 has an inwardly turned end 51 positioned substantially radial of the axis of the spring for engaging one of the bolts 36 that secures the master cylinder housing 35 to the cylinder 11. The opposite end of the spring 50 has an inwardly turned end 52 substantially radial of the axis of the spring that is adapted to rest between a pair of the raised lugs 53 provided on the inner face of the piston 12, as shown in Figures 1 and 8. The spring having each of its ends engaging a fixed portion on the wall of the cylinder 11 and the piston 12 thereby prevents rotation of the piston relative to the cylinder, and of the several parts carried thereby.

The tubular piston 16 carried by the power piston 12 enters the master cylinder 15 through a seal member 60. This seal 60 for the master cylinder 15 comprises a cylinder shell 55 that is slidable within a chamber 56 provided in the housing 35. The shell 55 has a coaxial recess 57 in which a rubber-like seal 58 is positioned. The seal 58 engages the outer periphery of the tubular piston 16 and also engages the outer wall of the recess 57 to seal against loss of fluid pressure within the master cylinder 15. An annular recess 59 is provided in the outer periphery of the shell 55 for connecting with a passage 61 that extends between the recess 57 and the recess 59. A passage 62 connects the recess 59 with the chamber 63 that is connected to a fluid reservoir 64 through a passage 65 in a fitting 66 placed in the closure nut 67 that is in threaded engagement with a threaded portion 68 of the chamber 63.

The seal 60 in the master cylinder 15 includes an annular disc 70 that has a clearance passage 71 around the outer periphery of the tubular piston 16 and has longitudinal passages 72 therein. The disc 70 is positioned against the shoulder 73 provided between the recess 57 and the larger recess 74 that is provided forwardly of the recess 57.

A spacer sleeve 75 is positioned between the disc 70 and the seal member 58 to retain the seal in position in the recess 57 without applying any pressure upon the seal member.

Forwardly of the disc 70 there is provided a second seal member 80 for sealing between the forward end of the tubular piston 16 and the peripheral wall of the recess 74. The seal 80 is retained in position by a metal bearing member 81 having one end thereof engaging the seal 80 and the opposite end engaging a snap ring 82 that retains the bearing member 81 in position within the recess 74 and also retains the seal assembly in assembled condition.

The seal member 80 is provided with a plurality of resilient ribs 83 on the forward face thereof that are engaged by the rear face of the bearing member 81 to take up manufacturing tolerances between the bearing member 81 and the seal 80 without causing any substantial pressure on the seal member 80.

The bearing sleeve 81 engages the outer periphery of the tubular piston 16 and forms thereby a bearing for the tubular piston in its reciprocal motion through the seal 60 into and out of the master cylinder 15.

The outer periphery of the bearing member 81 is provided with a series of flutes or passages 85 (see Fig. 6). The outer periphery of the seal member 80 is provided with a relieved portion that forms a chamber 86 between the seal 80 and the wall of the recess 74, see Figure 5. The seal member however normally closes the passage 72 in the disc 70 to prevent flow of fluid under pressure through the passage 72 in a leftward direction, as viewed in Figures 1 and 5. However, fluid from the reservoir 64 can pass through the passage 72, the chamber 86, past the peripheral lip 87 on the seal 80 and through the passages 85 in the bearing member 81 into the master cylinder 15 during a retraction movement of the pistons 16 and 17 to prevent a vacuum from developing in the master cylinder during a fast return stroke of the pistons 16 and 17.

When the piston 16 is in the position illustrated in Figures 1 and 5, a vent passage 88 in the forward end of the piston 16 communicates with a chamber 89 provided between the seal 80 and the forward end of the piston 16 whereby fluid within the master cylinder can flow into the reservoir through the passage 88, the passage 71 and through the holes 90 provided in the sleeve 75 to the reservoir passages 61, 62, and 65.

The master cylinder 15 is provided with a check valve 20, see Figure 9, for controlling flow of fluid to and from the pressure line 21 for the brake system. This check valve 20 comprises a cap or hat-like member 91 that is held on a rubber-like seat member 92 by means of a compression spring 93. A rubber-like disc member 94 is placed on the underside of the cap member 91 and covers the openings 95 in the member 91 against flow of fluid in a left-ward direction, as viewed in Figure 9. The disc-like member 94 is retained in position by a retaining member 96 that has passages 97 at the periphery thereof.

The discharge opening 18 from the master cylinder 15 connects with the check valve chamber 98 and the passage 99 in the fitting 100 connects with the pressure line 21.

The check valve 20 is thus of a construction whereby fluid under pressure can flow freely from the master cylinder 15 through the check valve 20 and into the pressure line 21. When pressure is released on the fluid in the master cylinder 15 the return flow of fluid will be required to lift the hat-like member 91 from the seat 92 against the action of the spring 93 so as to insure a positive minimum pressure being retained in the pressure line 21 at all times to prevent air leakage into the wheel cylinders 22 of the brakes.

The power piston 12 has a cup seal 101 at the periphery thereof retained on the piston by a retaining member 102. A radially expanding leaf type spring 103 urges the lip of the cup seal 101 against the inner periphery of the cylinder 11 a felt annular ring 104 being adapted to supply a slight amount of lubricant to the cup seal 101 and thereby lubricate the surface between the cup seal and the cylinder 11.

The power piston 12 contains the control valve 25 within a chamber 105 provided in the wall of the piston 12. The chamber 105 has a connecting chamber passage 106 having a seat 107 around the periphery thereof upon which the valve element 108 seats as retained thereby by a compression spring 109 positioned between the valve element 108 and the closure plate 110 for the chamber 105.

The chamber 105 connects with a source of negative pressure through a passage 111 that connects with a second passage 112 extending forwardly to the forward face 113 of the piston 12. The passage 112 receives one end of a pipe 114 that has a flexible conduit 115 secured on the free end thereof. The flexible conduit 115 encircles the axis of the chamber 38, as shown in Figure 3 and connects with a pipe 116 that passes through a seal member 117 provided in the wall of the chamber 38. The pipe 116 is connected with the intake manifold of a motor vehicle to provide the suitable source of negative pressure for supply to the chamber 105 in the piston 12.

A passage 118 is provided in the piston 12 for connection of the chamber passage 106 with the chamber 37 in the cylinder 11 whereby the pressure conditions in the chamber 37 can be changed from one of a positive pressure to one of a negative pressure under control of the actuation of the control valve 25.

The control valve 25 is operated by the valve actuator 26 that consists of a hollow cylinder 120 slidable in a bearing sleeve 121 provided in the piston 12. The internal bore 122 provides connection between the chamber 38 and the chamber passage 106 to provide for connection of the chamber 37 with the atmospheric pressure continuously existing in the chamber 38 through the bore 122, the chamber passage 106 and the passage 118.

The valve actuator 26 is carried upon a rigid member 125 that projects from a plunger member 126 slidable in the bore 127 provided in the piston 12 coaxially of the reaction rod 17. The member 126 is retained between an annular head 128 on a plunger member 126 and a snap ring 129 on the plunger member 126.

The plunger member 126 encircles the reaction rod 17 and is slidable thereon, but is limited in its sliding movement and is carried with the reaction rod through a snap ring 130 on the reaction rod 17. A compression spring 135 is positioned between the piston 12 and the member 125 to normally retain the hollow cylinder 120 of the valve actuator 26 in spaced relationship to the valve element 25, as illustrated in Figure 1, to thereby normally supply atmospheric pressure to both sides of the power piston 12 so that the compression spring 50 will position the piston 12 as illustrated in Figure 1.

The plunger member 126 is retained in the bore 127 against removal therefrom by the action of the compression spring 135 by a stop bracket 136 having its opposite ends fastened to the piston 12 by means of bolts 137, as illustrated in Figure 2.

The pedal push rod 28 is enclosed with a flexible rubber-like boot 140 that has one end thereof secured to the closure member 29 by a retaining member 141 and the opposite end enclosing the pedal push rod as illustrated at 142.

In operation, when the brake pedal 27 is moved downwardly, the pedal rod 28 is moved in right-hand direction, as viewed in Figure 1. Initial movement of the pedal rod 28 causes advancement of the reaction rod or central piston 17 as well as the plunger 126 and the cylinder 122 of the valve actuator 26. At this time no braking action develops because the vent 88 in the tubular piston 16 is connected to the reservoir. When sufficient forward movement is given to the pedal rod 28 and the plunger 126 to cause the forward end of the member 122 to close upon the valve element 108, positive pressure from the chamber 38 to the chamber 37 through the valve actuator 26 is thereby cut off. A slight additional movement of the pedal rod 28, and thus the valve actuator cylinder 122 causes the valve element 108 to lift from the seat 107 and thereby connect the source of negative pressure in the chamber 105 with the chamber 37 through the passages 106 and 118.

When the chamber 37 is connected with the source of negative pressure, the chamber is evacuated. Thus, atmospheric pressure standing against the left hand face of the piston 12 causes movement of the piston 12 in a right hand direction against the compression spring 50.

So long as the forward advancement of the pedal rod 28 and the piston 12 are exactly the same, pressure will be continuously applied to the liquid in the master cylinder 15 by simultaneous movement of the tubular piston 16 and the reaction rod or central piston 17. Fluid under pressure will be delivered to the brake cylinders 22 to apply the brakes.

However, should the action of atmospheric pressure on the piston 12 cause the piston to move more rapidly rightwardly than the rate of forward advancement of the pedal rod 28, or should the operator stop downward movement of the brake pedal, thus halting forward movement of the pedal rod 28, the piston 12 will advance just sufficiently to allow the valve element 108 to seat upon the seat 107 and thereby cut off connection between the chamber 37 and the source of negative pressure in the chamber 105. Slight additional movement of the piston 12 at this time will move the valve element 108 away from the end of the cylinder 122 of the valve actuator 26 thereby again allowing atmospheric pressure to be delivered from the chamber 38 to the chamber 37 through the valve actuator and the passages 106 and 118.

By the foregoing operation it will be understood that the movement of the power piston 12 will exactly follow the advancement of the pedal rod 28, and thus respond exactly to the braking action applied by the operator to the brake pedal 27.

When brake action is to be released, and the brake pedal 27 is allowed to move upwardly, thus causing retraction movement of the pedal rod 28, the actuator cylinder 122 will be withdrawn from engagement with the valve element 108 to allow it to seat upon the seat 107 to cut off the source of negative pressure in the chamber 105 from the chamber 37. Introduction of atmospheric pressure into the chamber 37 through the valve actuator cylinder 122 allows the spring 50 to become effective to move the piston 12 in a left hand direction, as viewed in Figure 1.

Retraction movement of the piston 12 will cause the tubular piston 16 to be retracted by engagement of the element 42 with the head 40 on the tubular piston to move it in a left hand direction. Also, with the piston 12 moving in a left-hand direction, the plunger 126 will engage the snap ring 130 on the reaction rod 17 to cause its retraction movement. This will continue until such time as the resilient rubber pad 145 on the bracket 136 engages the closure plate 29 to stop movement of the power piston and elements carried thereby.

In Figure 10 there is illustrated a slightly modified arrangement of manual actuating means for causing movement of the pedal push rod 28 of the power unit 10. In this arrangement the brake pedal 27a operates a piston 150 reciprocal in a cylinder 151. The cylinder 151 is fluid connected with a cylinder 152 through a conduit 153. The cylinder 152 has a piston 154 that connects on the end of the pedal push rod 28a.

The fluid system is supplied with fluid from the reservoir 155 to take up any leakage in the system.

A spring 156 in the cylinder 152 normally urges return of the pedal push rod 28a to its starting position.

It will be understood that downward movement of the brake pedal 27a causes movement of the piston 150 within the cylinder 151 to thereby transfer fluid from this cylinder to the cylinder 152 and thereby cause movement of the piston 154 and resulting in operation of the pedal push rod 28a in the same manner as heretofore described.

Thus, the system illustrated in Figure 10 provides for remote positioning of the power unit relative to the brake pedal.

While the form of embodiment of the invention as herein disclosed constitutes a preferred form, it is to be understood that other forms might be adopted as may come within the scope of the claims which follow.

What is claimed is as follows:

1. In a power unit for an automotive hydraulic brake, the combination of, a master cylinder, a central piston in said cylinder, a tubular piston in said cylinder positioned around said central piston, a power piston connected with said tubular piston for actuation thereof, valve means on said power piston offset radially of the axis of the piston for controlling power operation of the power piston, actuating means manually operated connected with said central piston for actuation thereof, a valve actuator slidable in said power piston and offset radially of the axis of the piston and engageable with said valve for operation thereof thereby, and a plunger member slidable in said power piston and connected with said actuating means for operation thereby and including a rigid member extending therefrom into engagement with said valve actuator to effect concurrent operation thereof with said plunger.

2. In a power unit for an automotive hydraulic brake, the combination of, a master cylinder, a pressure differential operated motor comprising a cylinder and a power piston therein, a tubular piston extending from said power piston into said master cylinder, a central piston operable within said tubular piston and actively effective on fluid in said master cylinder, said central piston having connection with manually effective actuating means, said power piston including valve means disposed in a chamber in said power piston for connecting one side of said piston with a negative pressure source, and a valve actuator slidable in said power piston and extending into said chamber into operating engagement with said valve means therein and connected with and actuated by said central piston for actuating said valve to render effective connection between the said one side of the said power piston and a negative pressure source in response to movement of said central piston and thereby cause power actuation of said power piston and movement of said tubular piston concurrently with movement of said central piston, said valve actuator including passage means therein for connection of said one side of said power piston with a positive pressure source upon halting of movement of said central piston relative to said master cylinder and during retraction movement thereof.

3. In a power unit for an automotive hydraulic brake, the combination of, a pressure differential operated motor comprising a cylinder and a power piston therein, said power piston dividing said cylinder into two chambers, one of said chambers being connected continuously to a source of positive pressure and the other of said chambers being connected to a source of negative pressure in response to actuation of valve means carried in a valve chamber in said power piston, a valve actuator for said valve means slidable in said power piston and extending into said chamber and engageable with said valve means and including a passage therein for connection of said one chamber with said other chamber, resilient means operably effective on said valve actuator normally positioning said valve actuator out of engagement with said valve means for interconnection of said chambers through said passage, a master cylinder carried on the cylinder of said pressure differential motor, a tubular piston extending from said power piston into said master cylinder, a manually operable central piston within said tubular piston and actively effective with said tubular piston on fluid in said master cylinder, and means rigidly connecting said valve actuator with said central piston for operation thereof thereby.

4. In a power unit for an automotive hydraulic brake, the combination of, a pressure differential operated motor including a cylinder and a power piston therein dividing said cylinder into two chambers, a master cylinder carried on the cylinder of said pressure differential motor, a tubular piston connected with said power piston and extending into said master cylinder, a central piston within said tubular piston and operable therewith for action upon fluid within said master cylinder, manually operated actuating means connected with said central piston for operation thereof, said power piston having a valve chamber therein and passage means connecting said valve chamber with a source of negative pressure and other passage means connecting said chamber with one side of said power piston and a valve element between the said passages to close off connection of said first mentioned passage with said second mentioned passage, a valve actuator slidably journaled in said power piston and extending into said valve chamber and having passage means therein for connection of said one side of said piston with a positive pressure source concurrently with connection of the other side of said power piston with a positive pressure source and engageable with said valve element to close the passage in the actuator and thereby the connection of said one side of said power piston from the positive pressure source and to operate said valve to open said one side of said power piston to the negative pressure source, and means connecting said valve actuator with said manually operated actuating means for actuation of said actuator concurrently therewith.

5. In a power unit for an automotive hydraulic brake, the combination of, a pressure differential operated motor including a cylinder and a power piston therein dividing said cylinder into two chambers, a master cylinder carried on the cylinder of said pressure differential motor, a tubular piston connected with said power piston and extending into said master cylinder, a central piston within said tubular piston and operable therewith for action upon fluid within said master cylinder, manually operated actuating means connected with said central piston for operation thereof, said power piston having a valve chamber therein and passage means connecting said valve chamber with a source of negative pressure and other passage means connecting said chamber with one side of said power piston and a valve element between the said passages to close off connection of said first mentioned passage with said second mentioned passage, a valve actuator slidably journaled in said power piston and extending into said valve chamber and having passage means therein for connection of said one side of said piston with a positive pressure source concurrently with connection of the other side of said power piston with a positive pressure source and engageable with said valve element to close the passage in the actuator and thereby connection of said one side of said power piston from the positive pressure source and to operate said valve to open said one side of said power piston to the negative pressure source, plunger means slidably journaled in said power piston engageable by said manually operated actuating means for actuation thereof concurrently therewith, a rigid member connecting said plunger means and said valve actuator to effect simultaneous movement thereof, and resilient means effective on said valve actuator to normally retain the same in position for connection of both sides of said power piston with the positive pressure source.

6. In a power unit for an automotive hydraulic brake, the combination of, a pressure differential operated motor including a cylinder and a power piston therein, a master cylinder carried on the cylinder of said motor, piston means extending from said power piston into said master cylinder and including a manually operated reaction rod slidable within a tubular piston, said power piston having a valve chamber therein and passage means connecting said chamber with a negative pressure source and other passage means connecting the said chamber with one side of said power piston, a valve element in said chamber for closing off connection between said first mentioned and second mentioned passages, a valve actuator slidable in said power piston axially movable with said valve element and having passage means therein for connection of said one side of said power piston with a source of positive pressure, said valve actuator being engageable with said valve element to close the passage in the actuator and thereby the said one side of the said power piston from the positive pressure source and open the same to the negative pressure source, a plunger member slidable in said power piston engaged by said reaction rod for operation thereof thereby and disposed around the rod coaxially thereof, a rigid connecting link between said plunger member and said valve actuator for concurrent operation thereof with said reaction rod, resilient means actively effective on said valve actuator for normally positioning the same for positive pressure connection to said one side of said power piston, and stop means carried on said power piston and engageable by said plunger member to establish normal position of said valve actuator in spaced relationship to said valve element.

(References on following page)

References Cited in the file of this patent

UNITED STATES PATENTS

| | | |
|---|---|---|
| 1,323,688 | Graham et al. | Dec. 2, 1919 |
| 1,848,464 | Dodge | Mar. 8, 1932 |
| 2,050,481 | Blazek et al. | Aug. 11, 1936 |
| 2,165,942 | Rossmann | July 11, 1939 |
| 2,241,374 | Alfieri | May 13, 1941 |
| 2,260,491 | Stelzer | Oct. 28, 1941 |
| 2,275,697 | Stelzer | Mar. 10, 1942 |
| 2,358,753 | Willett et al. | Sept. 19, 1944 |
| 2,377,699 | Klimkiewicz | June 5, 1945 |
| 2,415,035 | Penrose | Jan. 28, 1947 |
| 2,438,723 | Stelzer | Mar. 30, 1948 |
| 2,448,981 | Ingres | Sept. 7, 1948 |
| 2,450,160 | Price | Sept. 28, 1948 |
| 2,458,803 | Stelzer | Jan. 11, 1949 |
| 2,475,105 | Mitton | July 5, 1949 |
| 2,489,769 | Flick | Nov. 29, 1949 |
| 2,532,960 | Stelzer | Dec. 5, 1950 |
| 2,536,461 | Price | Jan. 2, 1951 |
| 2,610,613 | Bryant | Sept. 16, 1952 |
| 2,615,761 | Skinner | Oct. 28, 1952 |
| 2,658,347 | Stelzer | Nov. 10, 1953 |
| 2,705,402 | Stelzer | Apr. 5, 1955 |

FOREIGN PATENTS

| | | |
|---|---|---|
| 747,273 | France | Mar. 28, 1933 |
| 549,694 | Great Britain | Dec. 1, 1942 |